United States Patent
Hamaguchi

(10) Patent No.: US 9,247,101 B2
(45) Date of Patent: Jan. 26, 2016

(54) STORING SCANNED DOCUMENT DATA BASED ON AT LEAST A CONFIDENTIALLY ATTRIBUTE OF THE SCANNED DOCUMENT DATA

(71) Applicant: CANON KABUSHIKI KAISHA, Tokyo (JP)

(72) Inventor: Jun Hamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/444,937

(22) Filed: Jul. 28, 2014

(65) Prior Publication Data
US 2015/0036184 A1     Feb. 5, 2015

(30) Foreign Application Priority Data

Jul. 30, 2013     (JP) .................................. 2013-157694

(51) Int. Cl.
*H04N 1/00*     (2006.01)
*H04N 1/32*     (2006.01)
*H04N 1/44*     (2006.01)

(52) U.S. Cl.
CPC ....... *H04N 1/32363* (2013.01); *H04N 1/00244* (2013.01); *H04N 1/32106* (2013.01); *H04N 1/4433* (2013.01); *H04N 2201/0094* (2013.01); *H04N 2201/218* (2013.01)

(58) Field of Classification Search
CPC ............ H04N 1/32363; H04N 1/4433; H04N 1/32106; H04N 1/00127; H04N 1/00244; H04N 2201/218
USPC ................................................ 358/1.15, 1.16
See application file for complete search history.

(56) References Cited

U.S. PATENT DOCUMENTS

| | | | |
|---|---|---|---|
| 6,918,082 B1 * | 7/2005 | Gross et al. .................... | 715/206 |
| 8,489,634 B2 * | 7/2013 | Shirakawa ..................... | 707/781 |
| 2012/0210437 A1 * | 8/2012 | Karande et al. ................. | 726/26 |

FOREIGN PATENT DOCUMENTS

| | | | |
|---|---|---|---|
| JP | 2004-153516 A | | 5/2004 |
| JP | 2012-150532 A | * | 9/2012 |

OTHER PUBLICATIONS

English language machine translation of JP 2012-150532 A to Osuga.*
English language Abstract of JP 2012-150532 A to Osuga.*

* cited by examiner

*Primary Examiner* — Eric A Rust
(74) *Attorney, Agent, or Firm* — Canon USA Inc., IP Division

(57) ABSTRACT

An image forming apparatus reads an image, generates a file from the read image, and sets a confidentiality attribute of the file for identifying a storage destination of the file. The file is stored either in the image forming apparatus or in a remote apparatus based on the confidentiality attribute.

8 Claims, 13 Drawing Sheets

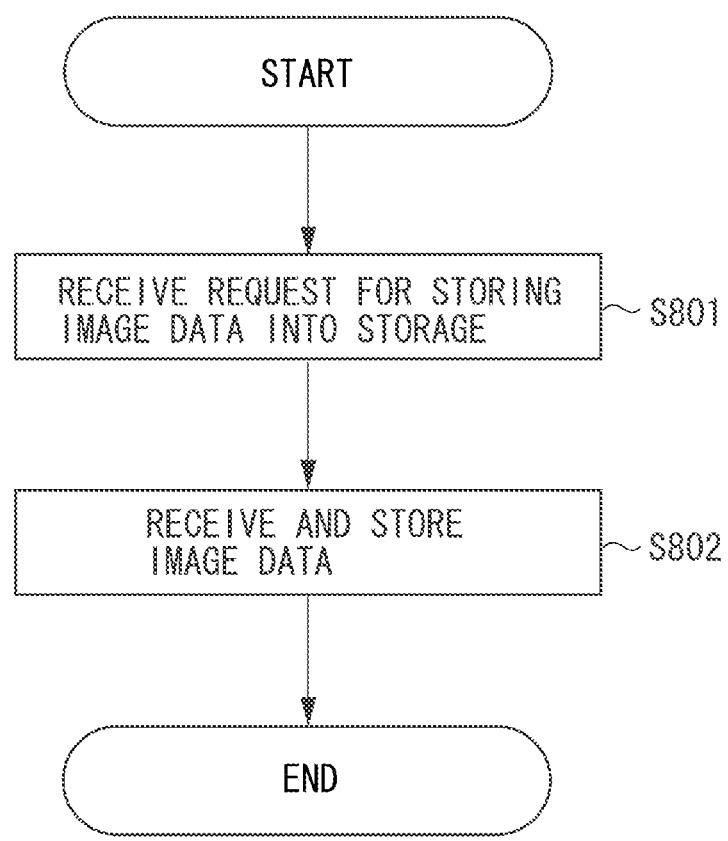

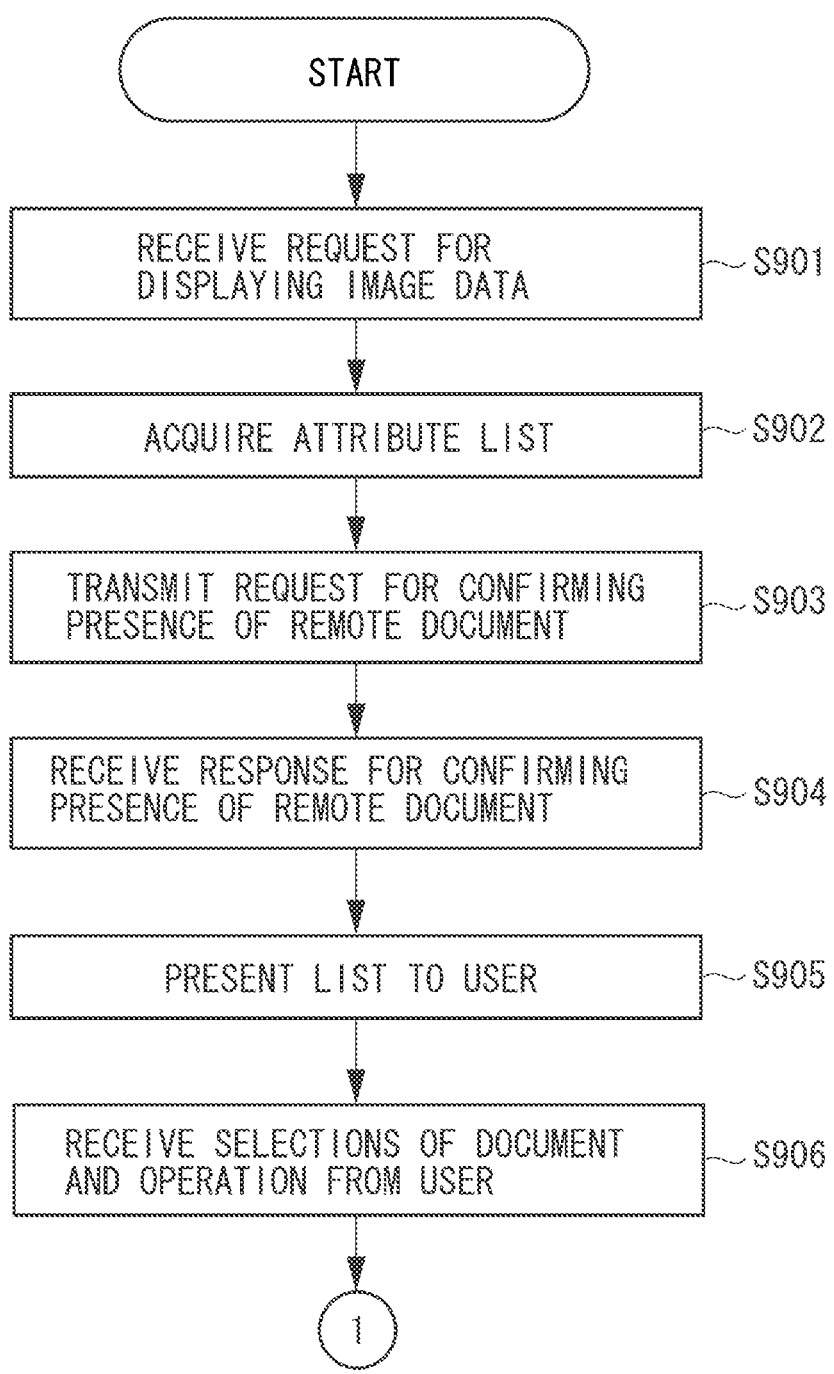

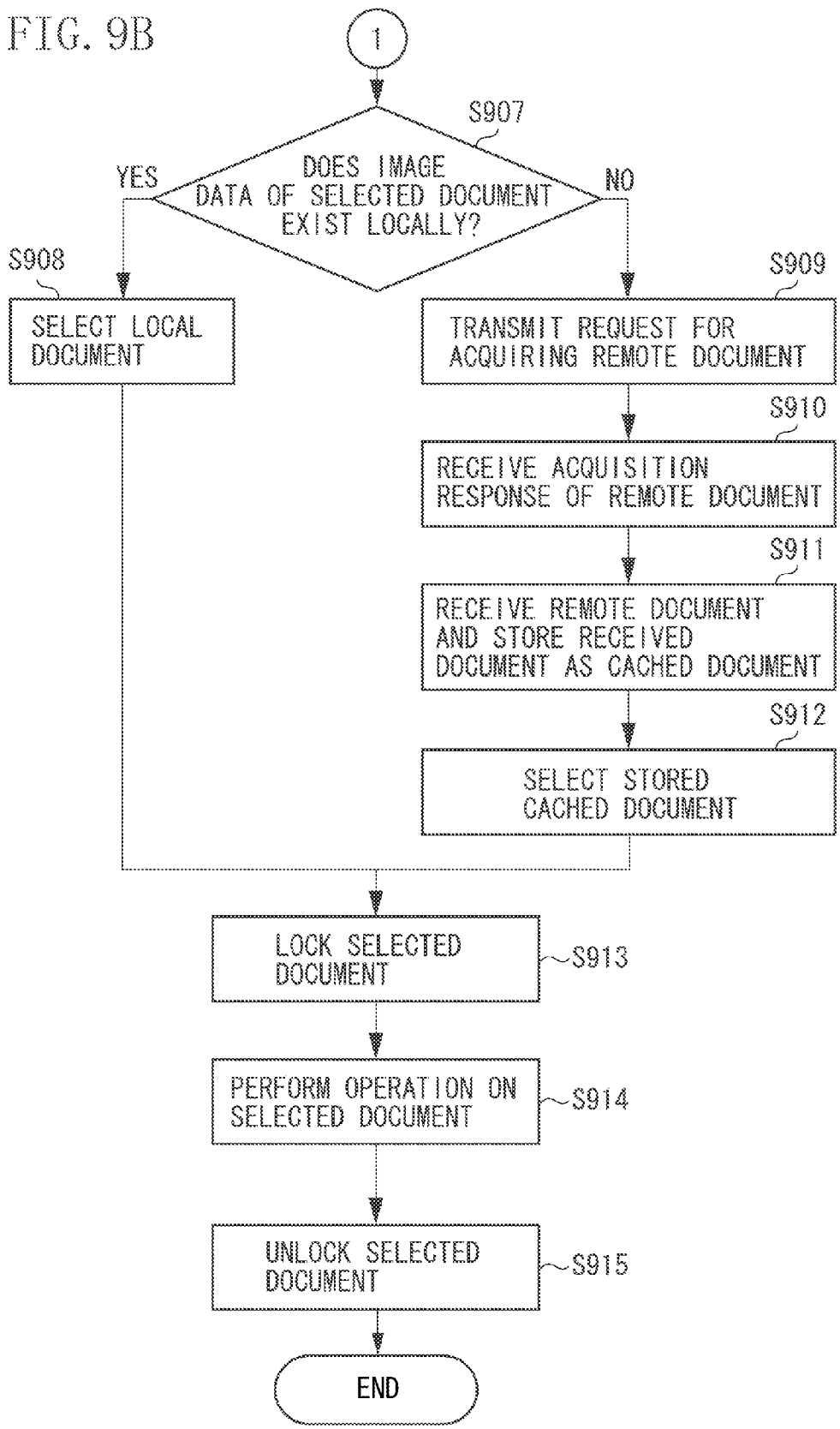

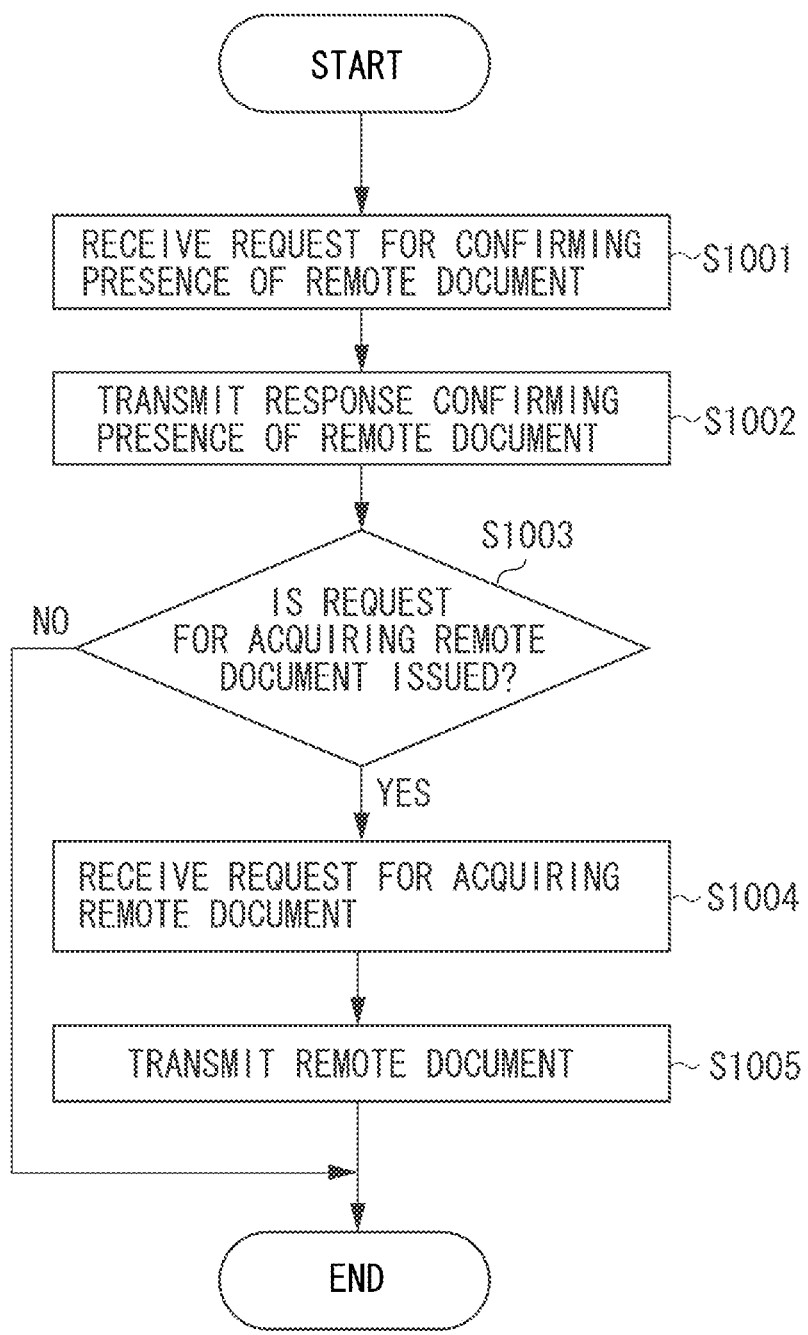

STORING SCANNED DOCUMENT DATA BASED ON AT LEAST A CONFIDENTIALLY ATTRIBUTE OF THE SCANNED DOCUMENT DATA

BACKGROUND

1. Field

Aspects of the present invention generally relate to an image forming apparatus, a method for controlling an image forming apparatus, and a program.

2. Description of the Related Art

Conventionally, storage devices are mounted on image forming apparatuses to realize a local storage function for storing a program, and allowing read image data to be stored, edited, printed, and browsed from a network. Further, in recent years, there has been also realized a remote storage function of allowing even image data shared with a storage connected via a network to be browsed, stored, edited, and printed in a similar manner to the local storage.

When a user scans and stores an image, the user selectively uses the above-described local storage and the above-described remote storage according to his/her purpose by choosing one of them before starting a job. Further, in recent years, a cloud storage service, which allows a large-capacity storage to be used in a network, has been widely provided, and use of such a large-capacity storage has been increasingly demanded compared with the local storage that has only a limited capacity and backup volume.

On the other hand, together with an extremely high demand for assuring security of data and protecting privacy, the image forming apparatuses are also requested to have a capability to completely delete image data and preference data recorded in the storages.

For example, regarding hard disks (hereinafter referred to as HDDs), some image forming apparatuses are configured to overwrite a region where deletion target data is stored, with dummy data a plurality of times for the purpose of removing remaining magnetism, thereby preventing the deleted data from being restored (refer to, for example, Japanese Patent Application Laid-Open No. 2004-153516).

However, use of the remote storage leads to the necessity of checking every time whether a scanned document does not contain a highly confidential page like a document that should not be presented to anyone outside the company, and whether the storage destination is a safe storage. Therefore, a workload on users may increase.

Further, according to the conventional techniques, the data overwriting deletion processing can effectively work for data stored in the local storage. However, when the remote storage is used, this processing only works when image data is moved to the remote storage, and does not work after that.

For example, placing a highly confidential document in the remote storage occurs by mistake and incurs a risk of an information leak. Once the document is placed in the remote storage, even if the file is deleted after noticing the mistake, the risk of the information leak cannot be reduced because the data overwriting deletion processing is not performed, so that a possibility of restoration of the image data exists.

SUMMARY

Aspects of the present invention are generally directed to providing a mechanism that can store a file by freely selecting a storage destination of the file between a local storage and a remote storage according to an attribute of the file to be stored.

According to an aspect of the present invention, an image forming apparatus that communicates with a remote apparatus includes a storage unit, a reading unit configured to read an image, a generation unit configured to generate a file from the image, a setting unit configured to set a confidentiality attribute to the file, and a control unit configured to store, based on the confidentiality attribute, store in the storage unit or the remote apparatus.

Further features of the present disclosure will become apparent from the following description of exemplary embodiments with reference to the attached drawings.

BRIEF DESCRIPTION OF THE DRAWINGS

FIG. 8 is a flowchart illustrating a method for controlling the server according to an exemplary embodiment.

FIGS. 9A and 9B are a flowchart illustrating a method for controlling the image forming apparatus.

FIG. 10 is a flowchart illustrating a method for controlling the server.

DESCRIPTION OF THE EMBODIMENTS

Various exemplary embodiments will be described in detail below with reference to the drawings.

Constituent elements described in these exemplary embodiments are merely examples are not seen to be limiting.
<Description of System Configuration>
(Description of Entire System)

Figure 1:
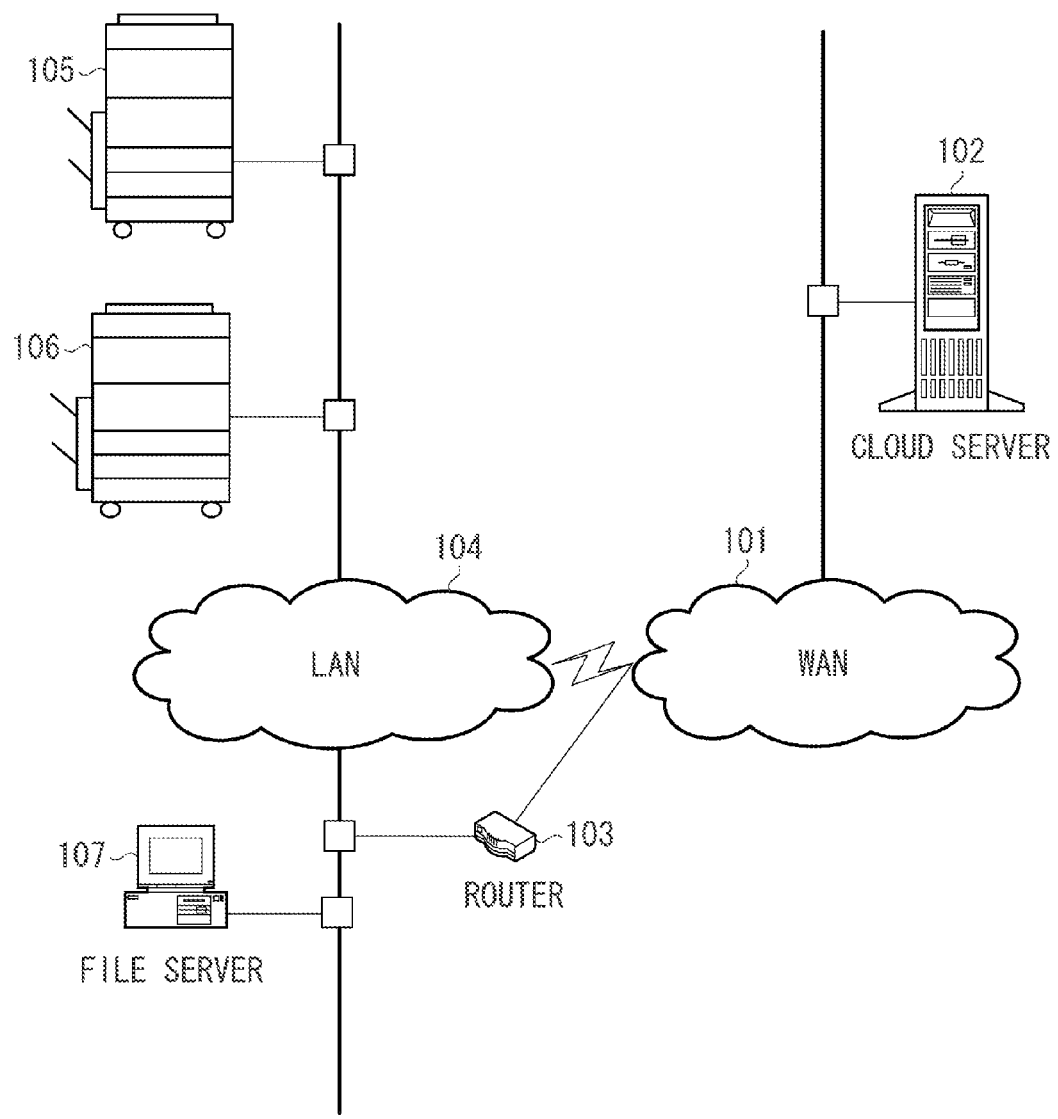
FIG. 1 is a block diagram illustrating an overview of a configuration of a system to which an image forming apparatus is connected.

FIG. 1 is a block diagram illustrating an overview of a configuration of a system to which an image forming apparatus according to a first exemplary embodiment is connected.

Referring to FIG. 1, an image management system includes a wide area network (WAN) 101, a cloud server 102, a router 103, a local area network (LAN) 104, image forming apparatuses 105 and 106, and a file server 107. The cloud server 102 and the router 103 are connected to the WAN 101 (wide area network).

Further, the image forming apparatuses 105 and 106, and the file server 107 are connected to the router 103 via the LAN 104 (local area network). The router 103 may be configured so as to also function as a firewall.

The could server 102 and the file server 107 are embodied by a workstation apparatus (a server apparatus) or the like including a central processing unit (CPU), a memory, a storage device, and a network interface. Each of these server apparatuses is configured to monitor a connection request from the network, input and output a file into and from the image forming apparatus 105 or 106, and manage files in the storage device. The LAN 104 is configured of known Ethernet (registered trademark) or the like.

(Description of Overview of Blocks of Controller)

Figure 2:
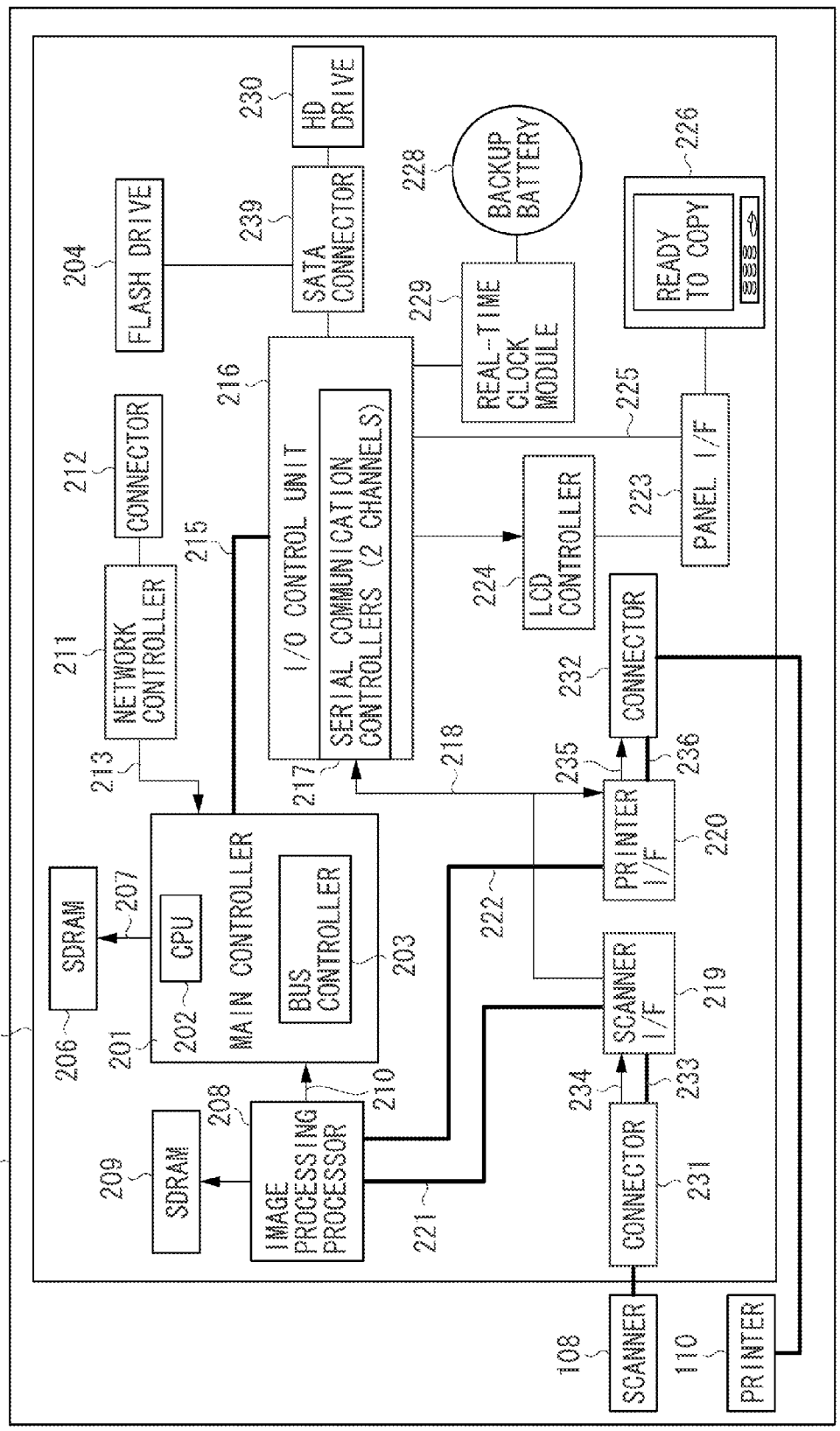
FIG. 2 is a block diagram illustrating an internal configuration of the image forming apparatus.

FIG. 2 is a block diagram illustrating an internal configuration of the image forming apparatuses 105 and 106 illustrated in FIG. 1. The image forming apparatuses 105 and 106 are a multifunction peripheral (MFP) that inputs/outputs and receives/transmits an image, and performs various kinds of image processing. Each of the image forming apparatuses 105 and 106 includes a scanner 108, which is an image input device, a printer 110, which is an image output device, and an image control device 109, which is a control unit. The image control device 109 is configured in the following manner.

Referring to FIG. 2, a main controller 201 mainly includes a CPU 202, a bus controller 203, and various kinds of interface (I/F) controller circuits. The CPU 202 and the bus controller 203 control an operation of the entire image control device 109, and the CPU 202 operates based on a program read in from a flash drive 204. The bus controller 203 controls a data transfer input and output from each I/F. In particular, the bus controller 203 mediates when the respective units compete for use of a bus, and controls a direct memory access (DMA) data transfer.

A synchronous dynamic random access memory (SDRAM) 206 is connected to the main controller 201 via a random access memory (RAM) I/F 207, and is used as a work area that allows the CPU 202 to operate, and an area for performing image processing on image data. An image processing processor 208 compresses raster image data stored in an SDRAM 209 according to a compression method such as Modified Huffman (MH), Modified READ (MR) ("READ" stands for relative element address designate), Modified Modified READ (MMR), Joint Bi-level Image experts Group (JBIG), or Joint Photographic Experts Group (JPEG). Further, conversely, the image processing processor 208 decompresses compressed and stored code data into raster image data.

Further, the image processing processor 208 performs image processing such as an image rotation, image zooming, a color space conversion, binarization, a movement, and a combination on the raster image data stored in the SDRAM 209. Further, the image processing processor 208 is connected to the scanner 108 and the printer 110 via a scanner bus 221 and a printer bus 222, and performs predetermined image processing on a video signal for each of them.

The image processing processor 208 is connected to the main controller 201 via an I/F 210. Data is transferred between the image processing processor 208 and the SDRAM 206 under control of the bus controller 203, and is DMA-transferred A network controller 211 is connected to the main controller 201 via an I/F 213, and is connected to the LAN 104 via a connector 212. An input/output (I/O) control unit 216 is connected to the main controller 201 via an I/F 215. The I/O control unit 216 is equipped with two channels of asynchronous serial communication controllers 217 for transmitting and receiving control commands to and from respective CPUs of the scanner 108 and the printer 110, and is connected to an I/F circuit 219 and an I/F circuit 220 via an I/O bus 218.

A panel I/F 223 is connected to a liquid crystal display (LCD) controller 224, and includes an I/F for providing a display on a liquid crystal screen on an operation unit 226, and a key input I/F for realizing inputs of a hard key and a touch panel key. Further, the panel I/F 223 is connected to the I/O control unit 216 via an I/F 225. The operation unit 226 includes a liquid crystal display unit, a touch panel input device attached on the liquid crystal display unit, and a plurality of hard keys. A signal input from the touch panel or the hard key is transmitted to the CPU 202 via the above-described panel I/F 223. The liquid crystal display unit displays image data transmitted from the panel I/F 223. A function in an operation of the present image forming apparatus 105, image data, and the like are displayed on the liquid crystal display unit.

A real-time clock module 229 is used to update and store a date and time managed within the apparatus, and is backed up by a backup battery 228. Serial Advanced Technology Attachment (SATA) interface 239 is used to connect to an external storage device. Normally, a hard disk drive (HDD) 230 and the flash drive 204 are connected via this I/F, through which a system program, user data, and image data are input and output.

In the present exemplary embodiment, the image forming apparatus 105 is configured to connect a partial region in the HDD 230 to the file server 107 and the cloud server 102 via the network controller 211 to expand the capacity. Further, a program for causing the system according to the present exemplary embodiment to operate is included in the above-described system program. A connector 231 and a connector 232 are connected to the scanner 108 and the printer 110, respectively, and include asynchronous serial I/Fs (234 and 235) and video I/Fs (233 and 236), respectively.

The scanner I/F 219 is connected to the scanner 108 via the connector 231, and is connected to the image processing processor 208 via the scanner bus 221. The scanner I/F 219 has a function of performing predetermined processing on an image received from the scanner 108. The scanner 108 reads a document and transfers image data to the image processing processor 208. Further, the scanner I/F 219 also has a function of outputting a control signal generated based on a video control signal transmitted from the scanner 108 to the scanner bus 221. The data transfer from the scanner bus 221 to the SDRAM 209 is controlled by the bus controller 203.

The printer I/F 220 is connected to the printer 110 via the connector 232, and is connected to the image processing processor 208 via the printer bus 222. The printer I/F 220 has a function of performing predetermined processing on image data output from the image processing processor 208 and outputs the processed image data to the printer 110. Further, the printer I/F 220 also has a function of outputting a control signal generated based on a video control signal transmitted from the printer 110 to the printer bus 222.

(Description of Server)

Figure 3:
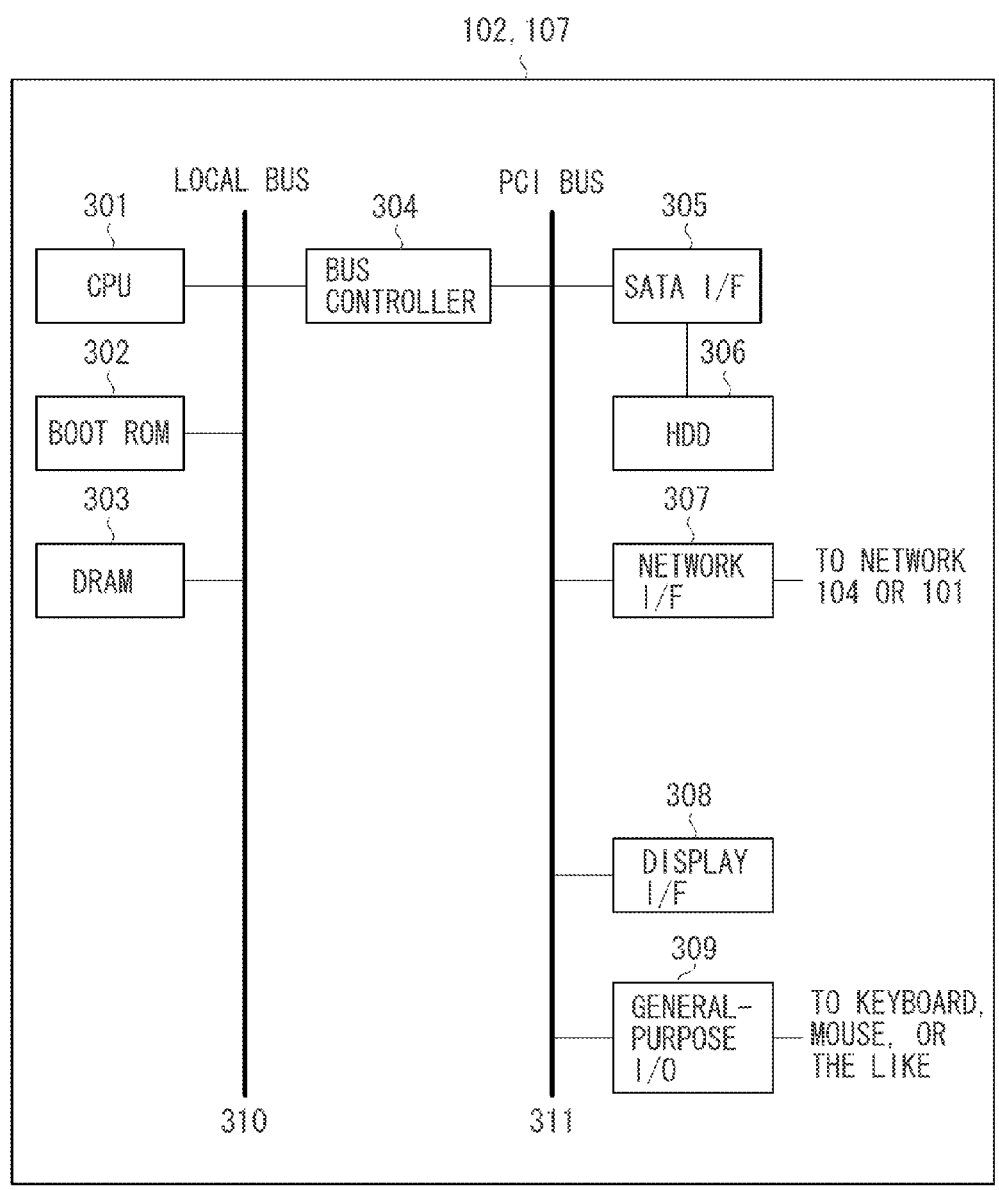
FIG. 3 is a block diagram illustrating an overview of a configuration of a file server and a cloud server.

FIG. 3 is a block diagram illustrating an overview of a configuration of the file server 107 and the cloud server 102 illustrated in FIG. 1.

Referring to FIG. 3, a CPU 301, a boot read only memory (ROM) 302, and a dynamic random access memory (DRAM) 303 are connected to a local bus 310. A bus controller 304 controls the local bus 310 and a Peripheral Component Interconnect (PCI) bus 311. A storage I/F 305 is connected to the PCI bus 311, and a storage device such as an HDD 306 is connected via this storage I/F 305. The CPU 301 executes a command code developed into the DRAM 303 to perform calculation processing. Further, the CPU 301 executes a Basic Input/Output System (BIOS) code stored in the boot ROM 302 when the server is powered on or is reset.

The boot ROM 302 stores the above-described BIOS code. The CPU 301 executes the BIOS code to initialize the bus controller 304, the storage I/F 305, and a network I/F 307.

After the initialization, the CPU 301 reads out an initial execution code from the HDD 306 or the network I/F 307 and develops the initial execution code on the DRAM 303, and boots a system program under which the CPU 301 operates. A program for causing the system according to the present exemplary embodiment to operate is included in the above-described system program. The DRAM 303 is used as a primary storage device of the CPU 301, and stores a command code, an execution program, and various kinds of data.

The HDD 306 is used as a nonvolatile secondary storage device, and stores an execution program and various kinds of data. The data stored in the HDD 306 is retained even after turn off of power supply. Further, the HDD 306 has a significantly larger storage capacity although its response speed is slower compared to the DRAM 303.

The file server 107 and the cloud server 102 include the network I/F 307 connected to the PCI bus 311. The network I/F 307 is connected to an external network to allow the file server 107 and the cloud server 102 to communicate with a client in the network.

A display I/F 308 is connected to a monitor. The display I/F 308 includes a video controller, and controls the operation unit 226 according to a command from the CPU 301. A user's operation is input from an input device such as a keyboard or a mouse via a general-purpose I/O 309, and a signal thereof is transmitted to the CPU 301. Then, the CPU 301 outputs drawing data to the operation unit 226.

As roles of the file server 107 and the cloud server 102 are to provide a function of receiving and storing/holding image data read by the image forming apparatus 105, and an image management function of transmitting information of the held image data to the image forming apparatus 105. Further, the file server 107 and the cloud server 102 provide a function of authenticating a user, a function of managing an upper limit of a storage capacity for each user, a function of permitting or prohibiting a file operation by each user, and a function of notifying a user of server information. The image forming apparatus 106, which includes the image control device 109, has similar functions to the file server 107 and the cloud server 102, and can also realize the above-described functions.

(Overview of Document Management System)

Figure 4:
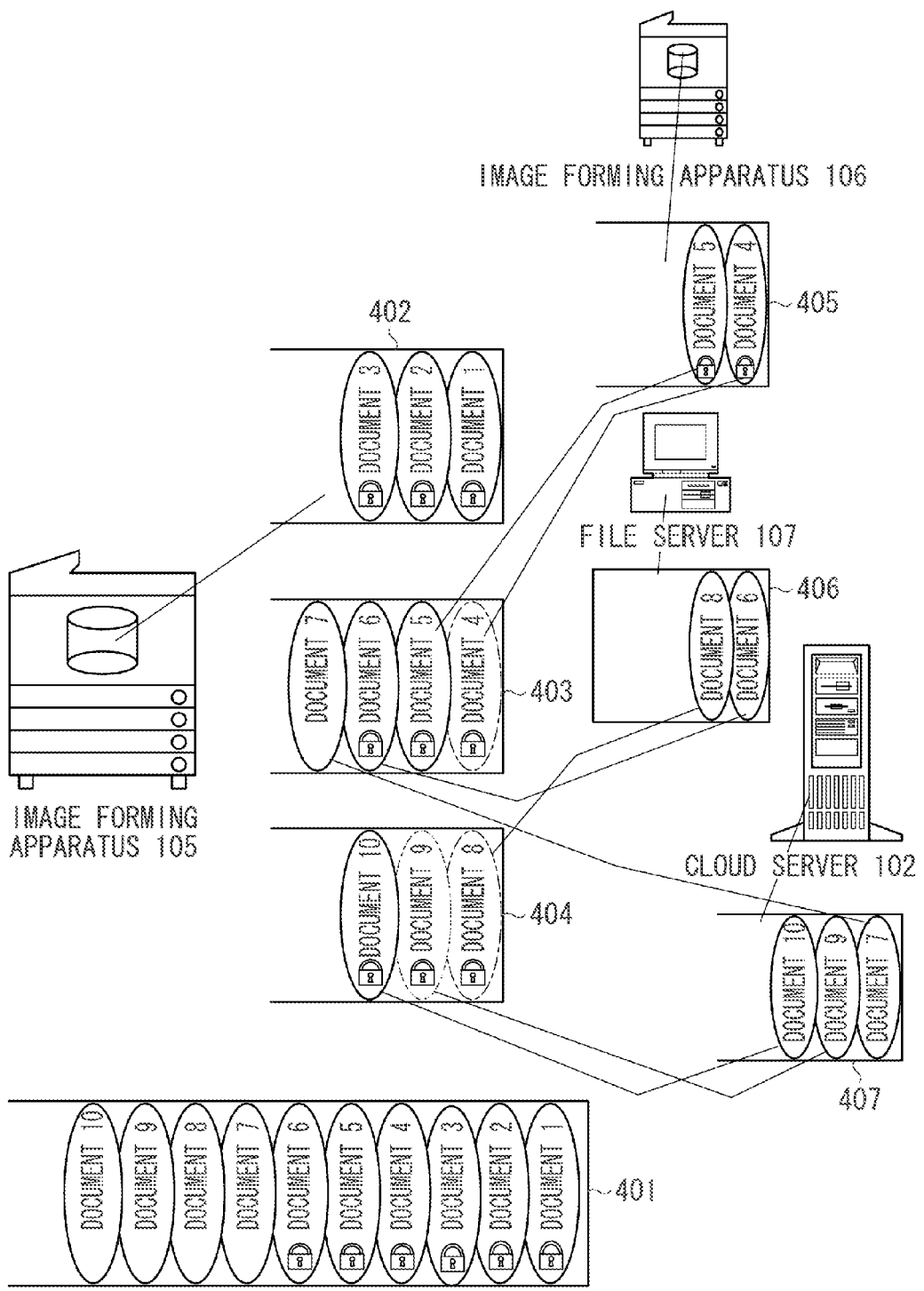
FIG. 4 illustrates a concept of a system that manages the file storages in apparatuses on a network.

FIG. 4 illustrates a concept of a system in which the image forming apparatus 105 illustrated in FIG. 1 manages a read image data bundle in the storages of the apparatuses on the network as a document. In the following description, the present exemplary embodiment will be described based on an example in which a confidential document is managed as a file for which a limitation is imposed on a movement of a file stored in the HDD 230 from a local apparatus into a remote apparatus.

Referring to FIG. 4, the image forming apparatus 105 displays a list of attribute information pieces of read documents in the form of a queue 401 to a user. The displayed list indicates that, the closer a document is located to a document 10 placed on a front side (the left side in FIG. 4) in the queue 401, the more recently the document has been updated. The closer a document is located to a document 1 on a back side (the right side in FIG. 4), the older the document.

Each of the documents indicates whether this document contains confidential information as an attribute (a document attribute will be described below), and a lock icon suggests a document having this attribute. Further, each document has an attribute indicating whether the document is managed together with an accompanied actual file or an actual entity of the file is managed in another storage. FIG. 4 illustrates an example in which documents having the former attribute are drawn by solid lines, and documents having the latter attribute are drawn by broken lines.

The CPU 202 of the image forming apparatus 105 manages the document attributes of the documents 1 to 10 displayed in the form of the queue 401 while internally categorizing them into queues 402 to 404. The queue 402 means managing the local documents 1 to 3, which are held only in the HDD 230 in the image forming apparatus 105. The queue 403 means managing the cached documents 4 to 7, which are held in the HDD 230 in the image forming apparatus 105 and are also held in another apparatus in the network.

The queue 404 means managing the remote documents 8 to 10, which are not held in the HDD 230 in the image forming apparatus 105 and are held in another apparatus on the network. The image forming apparatus 106 manages the documents 4 and 5 in the storage of its own image forming apparatus 106 as confidential documents, and this is expressed as a queue 405.

The file server 107 manages the documents 6 and 8 in its own storage of the file server 107, and this is expressed as a queue 406. The cloud server 102 manages the documents 7, 9, and 10 in its own storage of the cloud server 102, and this is expressed as a queue 407.

(Operation Flow of Image Forming Apparatus when Storing Data)

Figure 5:
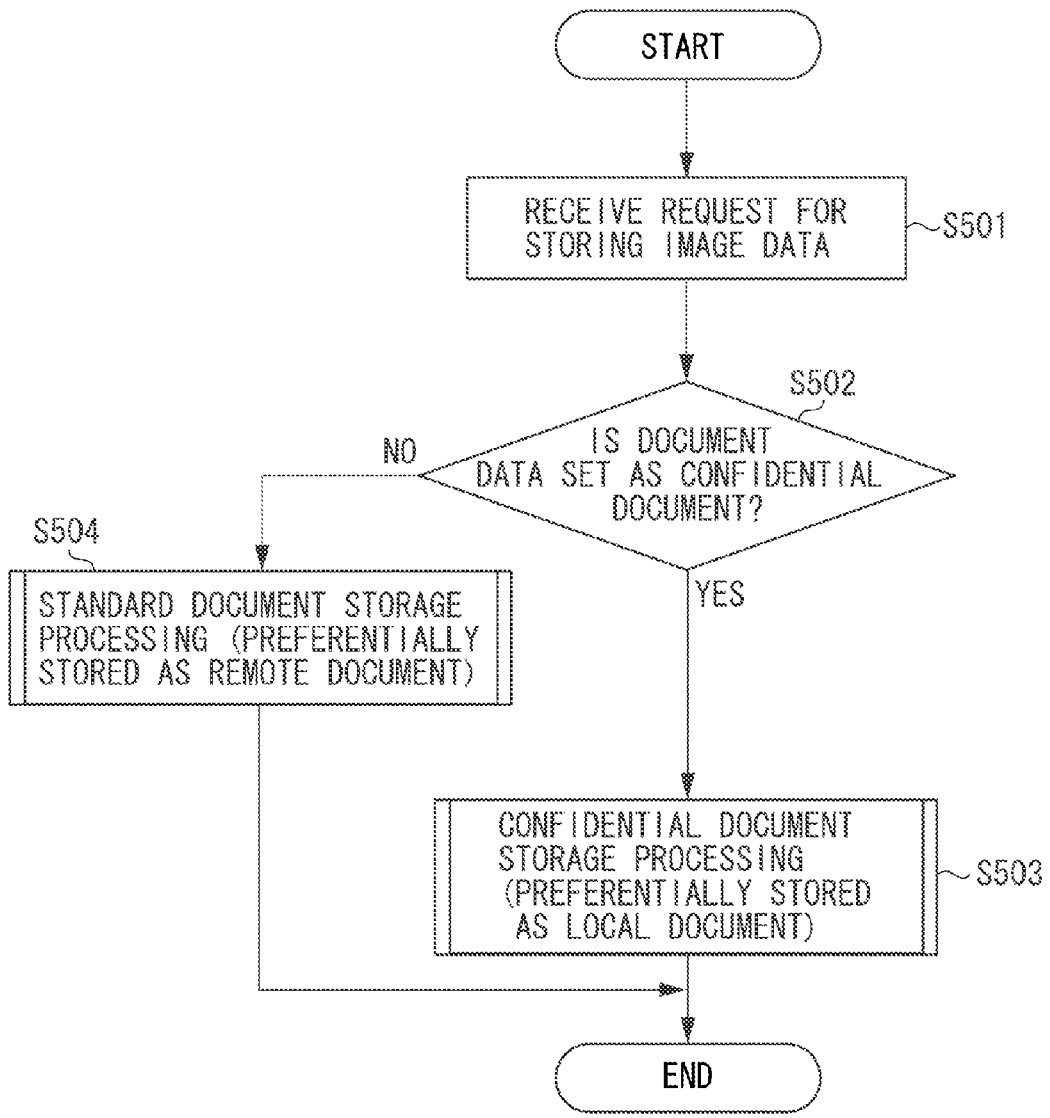
FIG. 5 is a flowchart illustrating a method for controlling the image forming apparatus.

FIG. 5 is a flowchart illustrating a method for controlling the image forming apparatus according to the present exemplary embodiment. The present example corresponds to an example of processing in which the CPU 202 in the image forming apparatus 105 stores a read image data bundle as a document. The CPU 202 executes the control program stored in the HDD 230, the flash drive 204, or the like, by which respective steps are realized.

In step S501, the CPU 202 receives a request for storing a read document. Subsequently, in step S502, the CPU 202 determines processing to be performed based on a flag that indicates as the attribute of the read document whether this document is a confidential document. If the CPU 202 determines in step S502 that the document data is set as a confidential document (YES in step S502), in step S503, the CPU 202 performs processing for storing a confidential document. Then, the present processing ends. The processing for storing a confidential document is processing for preferentially storing a document as a local document, as will be described below.

On the other hand, if the CPU 202 determines in step S502 that the document data is not set as a confidential document (NO in step S502), in step S504, the CPU 202 performs processing for storing a standard document. Then, the present processing ends. The processing for storing a standard document is processing for preferentially storing a document as a remote document, as will be described below.

(Flow in which Image Forming Apparatus Determines Processing when Storing Image Data Locally)

Figure 6:
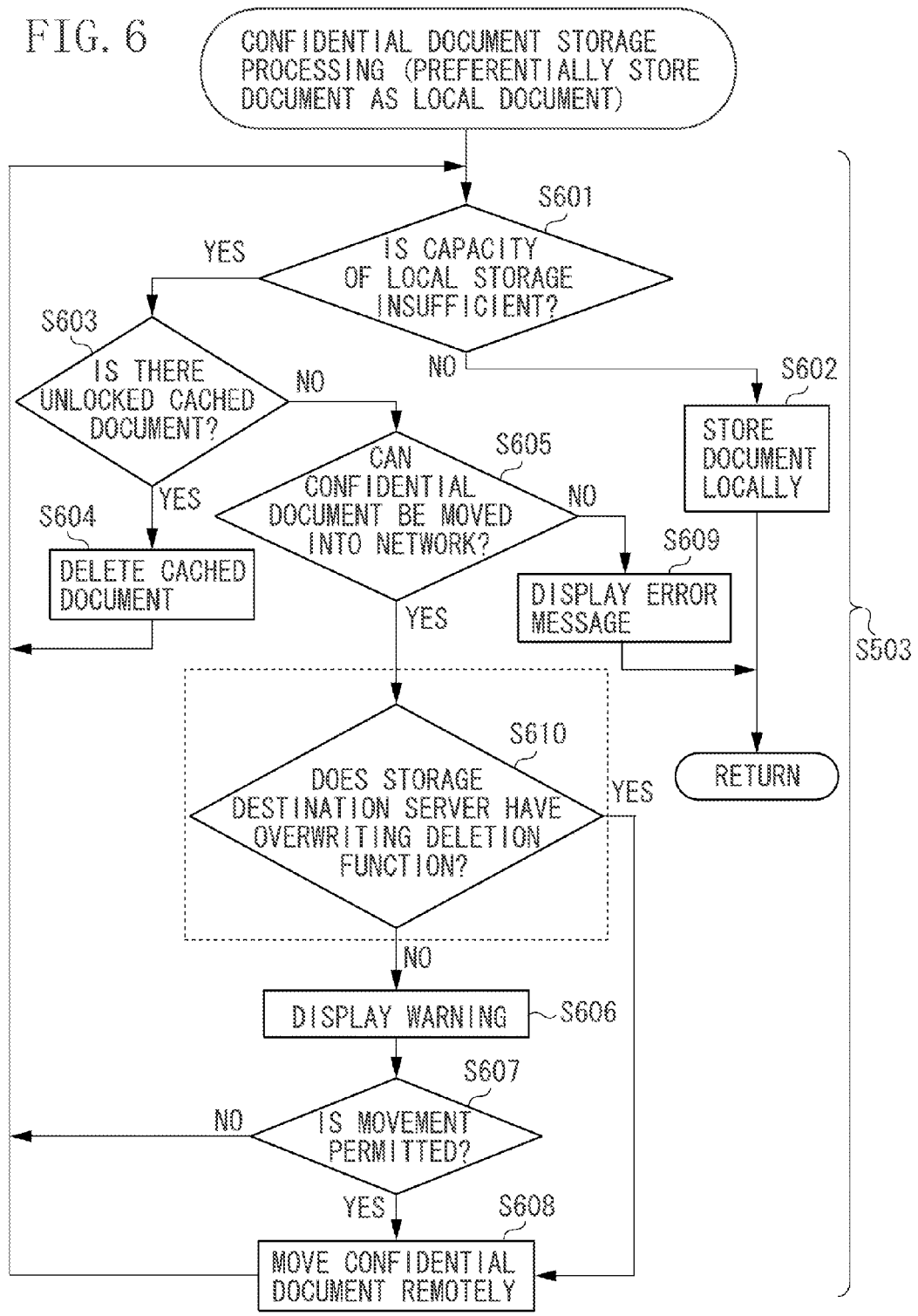
FIG. 6 is a flowchart illustrating a method for controlling the image forming apparatus.

FIG. 6 is a flowchart illustrating a method for controlling the image forming apparatus according to the present exemplary embodiment. The present example is a detailed flow of processing in which the CPU 202 in the image forming apparatus 105 locally stores the read image data bundle as a document (S503). The CPU 202 executes the control program stored in the HDD 230, the flash drive 204, or the like, by which respective steps are realized. Further, the HDD 230 functions as the local storage. According to this flow, if the CPU 202 detects that a free capacity of the HDD 230 corresponding to a first storage unit is a predetermined capacity or smaller, the CPU 202 determines whether any deletable file is stored in the HDD 230. Then, if the CPU 202 determines that a deletable file is stored, the CPU 202 deletes this deletable file. In the following description, this processing will be described. Further, a description will be given of an example of movement control that controls a movement of a file with the confidentiality attribute set thereto to the remote apparatus according to a reply from the user in response to an inquiry about whether to permit or prohibit the movement of the confidential document, which will be described below.

In step S601, the CPU 202 determines whether the device set as the storage destination has a sufficient capacity for storing the document according to a request for preferentially storing the read document as a local document. If the CPU 202 determines in this step that the storage destination has a sufficient capacity (NO in step S601), in step S602, the CPU 202 stores the read document into the local HDD 230. Then, the present processing ends.

On the other hand, if the CPU 202 determines in step S601 that the capacity of the local storage is insufficient (YES in step S601), the CPU 202 advances the processing to step S603 corresponding to document deletion and steps thereafter, to secure the capacity of the local storage.

More specifically, in step S603, the CPU 202 determines whether there is a deletable document (an unlocked document) among the queue 403 which manages cached documents The documents in the queue 403 are documents stored as remote documents and are also cached in the local apparatus temporarily. If the CPU 202 determines in this step that there is a deletable document in the queue 403 (YES in step S603), in step S604, the CPU 202 deletes the document, starting from the oldest document among the cached documents sequentially. Then, the processing returns to step S601, in which the CPU 201 continues the processing for determining whether the capacity is insufficient.

On the other hand, if the CPU 202 determines in step S603 that all cached documents are deleted (NO in step S603), in step S605, the CPU 202 determines whether there is a movable document among the queue 402 which manages local documents. The documents in the queue 402 are documents stored as local documents or are locked because they are being stored. Further, the CPU 202 determines whether there is a server or another image forming apparatus (the image forming apparatus 106 in the present exemplary embodiment) to which a confidential document can be moved, in the network registered with the image forming apparatus 105 in advance. At this time, the server includes the file server 107 and the cloud server 102.

Subsequently, if the CPU 202 determines as a result of the determination in step S605 that a confidential document can be moved to the network (YES in step S605), the processing proceeds to step S606. Step S606 is a process performed when the CPU 202 has determined in step S603 that no deletable file is stored and has determined in step S610 that an acquired deletion function does not have an overwriting deletion function. In step S606, the CPU 202 inquires whether to move the file with the above-described confidentiality attribute set thereto to the remote server.

In step S606, the CPU 202 inquires of the user whether to move the file with the confidentiality attribute set thereto to the remote server. More specifically, the CPU 202 displays a warning on the operation unit 226 with use of a user interface (UI) screen to inquire whether the user permits the local document to be moved to the remote server (the file server 107, the cloud server 102, and the like) or the image forming apparatus 106 to which the document can be moved, starting sequentially from the oldest document among the local documents. In the present exemplary embodiment, the image forming apparatus 106 has the data overwriting deletion function.

Subsequently, if the CPU 202 determines that the CPU 202 has received a rejection against the movement selected on this inquiry screen by the user, from the operation unit 226 (NO in step S607), the processing returns to step S601 without moving this document.

On the other hand, if the CPU 202 determines in step S607 that this document can be moved (YES in step S607), the CPU 202 secures a free capacity in the local HDD 230 by moving this document to any of the remote image forming apparatus 106, cloud server 102, and file server 107 to which the document can be moved. Then, the processing returns to step S601.

On the other hand, if the CPU 202 determines in step S605 that there is no movable document or there is no remote storage location to which a confidential document can be moved (NO in step S605), in step S609, the CPU 202 displays an error message indicating accordingly on the operation unit 226 with use of a UI screen. Then, the present processing ends.

Alternatively, the present exemplary embodiment may be configured such that step S610 is provided between the above-described steps S605 and S606, and the CPU 202 determines whether it is necessary to issue the warning to the user regarding whether to permit or prohibit the movement of the document.

More specifically, in step S610, the CPU 202 makes a determination whether the storage destination is the image forming apparatus 106 having the data overwriting deletion function, or the normal file server 107 or cloud server 102 by identifying each remote apparatus. At this time, if the remote apparatus to which the document should be moved is the image forming apparatus 106 (YES in step S610), the CPU 202 determines that the remote apparatus is a secure storage, and advances the processing to step S608 while skipping the warning processing corresponding to steps S606 and S607.

(Flow for Determining Processing when Image Forming Apparatus Stores Image Data Remotely)

Figure 7:
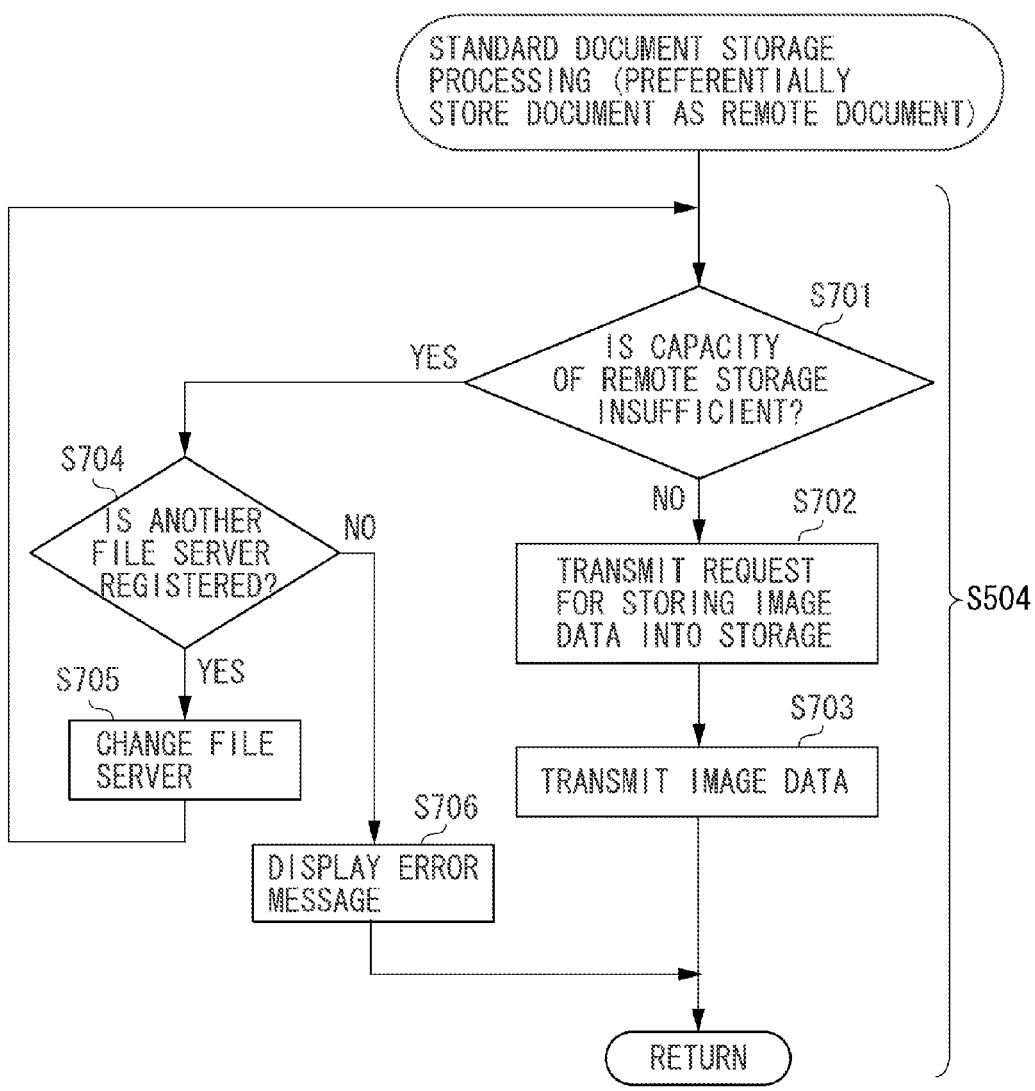
FIG. 7 is a flowchart illustrating a method for controlling the image forming apparatus.

FIG. 7 is a flowchart illustrating a method for controlling the image forming apparatus according to the present exemplary embodiment. The present example is a detailed flow of step S504, which corresponds to processing in which the CPU 202 in the image forming apparatus 105 remotely stores the read image data bundle as a document. The CPU 202 executes the control program stored in the HDD 230, the flash drive 204, or the like, which realizes respective steps Further, the HDD 230 functions as the local storage.

In step S701, the CPU 202 determines whether the remote storage has a sufficient capacity to store the document according to a request for preferentially storing the read document as a remote document. If the CPU 202 determines in this step that the capacity of the remote storage is not insufficient (NO in step S701), in step S702, the CPU 202 transmits a request for storing the read document to the cloud server 102 corresponding to the remote file server. Subsequently, in step S703, the CPU 202 transmits the image data. Then, the present processing ends.

On the other hand, if the CPU 202 determines in step S701 that the capacity of the remote storage is insufficient (YES in step S701), the CPU 202 advances the processing to step S704 for searching for another remote server, and steps thereafter, to secure the storage capacity.

More specifically, in step S704, the CPU 202 determines whether another file server is registered. If the CPU 202 determines in this step that another file server is registered (YES in step S704), in step S705, the CPU 202 changes the file server set as the storage destination, and causes the processing to return to step S701 to continue the determination whether the capacity is insufficient.

On the other hand, if the CPU 202 determines in step S704 that all file servers are unavailable (NO in step S704), in step S706, the CPU 202 displays an error message on the operation unit 226. Then, the present processing ends.

According to the present exemplary embodiment, it is possible to prevent the user from putting highly confidential data on a network place unintentionally, and thereby to expand the capacity for storing documents while keeping security. Further, it is possible to simplify the deletion processing in the local storage by actively placing less confidential data into the remote storage, and minimize wearing-away of the storage without putting a squeeze on the capacity.

(Operation Flow of File Server when Storing Data)

FIG. 8 is a flowchart illustrating a method for controlling the server according to the present exemplary embodiment. Especially, this example corresponds to a basic flow when the CPU 301 in the file server 107 illustrated in FIG. 1 receives an image data bundle from the network as a document and stores the image data. The CPU 301 executes the control program stored in the HDD 308 or the like, which realizes respective steps.

In step S801, the CPU 301 receives a request for establishing connection to the storage in the file server 107 and storing the image data. Further, in step S802, the CPU 301 receives and stores the image data according to the request. Then, the present processing ends.

(Operation Flow of Image Forming Apparatus when Using Data)

FIGS. 9A and 9B are a flowchart illustrating a method for controlling the image forming apparatus according to the present exemplary embodiment. This processing is a basic flow when the CPU 202 in the image forming apparatus 105 uses a stored image data bundle as a document. The CPU 202 executes the control program stored in the HDD 230, the flash drive 204, or the like, which realizes respective steps. Further, the HDD 230 functions as the local storage.

In step S901, the CPU 202 receives a request for displaying stored documents. Subsequently, in step S902, the CPU 202 acquires document attribute information 401 stored in the HDD 230. Subsequently, in step S903, the CPU 202 identifies remotely stored documents from the document attributes, and inquires whether there is image data contained in each of the documents, of a server functioning as a storage destination where the document is stored.

Subsequently, in step S904, the CPU 202 receives a response for confirming the presence, from the server as the storage destination. After that, in step S905, the CPU 202 displays a list of locally stored documents and remotely stored documents on the operation unit 226 with use of icons or the like.

Subsequently, in step S906, the user selects a document from the list and performs an operation on this document from the operation unit 226, by which the CPU 202 receives a request for identifying the document and the operation. The operation at this time means changing the title of the document, changing the attribute about whether the document is confidential, combining the document, deleting the document, previewing the document, printing the document, moving the document, and the like.

Subsequently, in step S907, the CPU 202 determines whether the actual entity of the image data of the selected document is stored in the local HDD 230 or the remote file server 107. If the CPU 202 determines as a result that the selected document exists locally (YES in step S907), the processing proceeds to step S908. In step S908, the CPU 202 selects the local document based on the received document identification information.

On the other hand, if the CPU 202 determines in step S907 that the actual entity of the image data of the selected document exists remotely (NO in step S907), in step S909, the CPU 202 selects the remote document based on the received document identification information, and transmits an acquisition request to the server where the document is stored. Subsequently, in step S910, the CPU 202 receives an acquisition response from the server where the document is stored. After that, in step S911, the CPU 202 receives the remote document from the server where the document is stored, and stores the data in the local HDD 230 as a cached document. After that, in step S912, the CPU 202 selects the cached document stored in step S911.

Subsequently, in step S913, the CPU 202 performs locking processing on the selected document. The locking processing here means a flag operation in the document attribute which the CPU 202 sets to prevent the document from being deleted, moved, and the like until the operation ends. Subsequently, in step S914, the CPU 202 performs the above-described operation on the locked selected document. After the operation is completed, in step S915, the CPU 202 performs unlocking processing on the selected document. The unlocking processing here means a flag operation in the document attribute which the CPU 202 sets to indicate that the document is now allowed to be deleted or moved.

(Operation Flow of File Server when Using Data)

FIG. 10 is a flowchart illustrating a method for controlling the server according to the present exemplary embodiment. The present example is a basic flow when the CPU 301 in the file server 107 uses a stored image data bundle as a remote document. The CPU 301 executes the control program stored in the HDD 308 or the like, which realizes respective steps.

In step S1001, the CPU 301 receives a request for establishing connection to the storage in the file server 107 and confirming the presence of image data. Further, in step S1002, the CPU 301 determines whether the image data exists, and transmits file information. Subsequently, in step S1003, the CPU 301 determines whether a request for acquiring the image data is issued within a predetermined time period. If a request for acquiring the image data is issued at this time (YES in step S1003), the processing proceeds to step S1004. In step S1004, the CPU 301 receives the request for acquiring the remote document. Subsequently, in step S1005, the CPU 301 transmits the requested remote document. Then, the present processing ends. On the other hand, if a request for acquiring the image data is not issued even after the predetermined time period has elapsed (NO in step S1003), the present processing ends due to time-out.

(Description of Examples of Warning Screens)

Figure 11:
FIG. 11 illustrates display examples of warning screens of the image forming apparatus illustrated in FIG. 1.

FIG. 11 illustrates display examples of warning screens of the image forming apparatus 105 illustrated in FIG. 1. Referring to FIG. 11, the CPU 202 displays these screens on the operation unit 226. A screen 1101 is a screen example when the CPU 202 issues the error warning in the above-described step S609. An error warning screen S1005 is a display indicating that the capacity of the remote storage is insufficient. A screen 1102 is a screen example when the cached document is deleted in the above-described step S604, and is displayed only on a status bar located at the bottom. A screen 1103 is a screen example when the CPU 202 issues the warning to make a determination whether to move the confidential document to another network place in the above-described step S606.

(Overview of Document Attributes Managed by Image Forming Apparatus)

Figure 12:
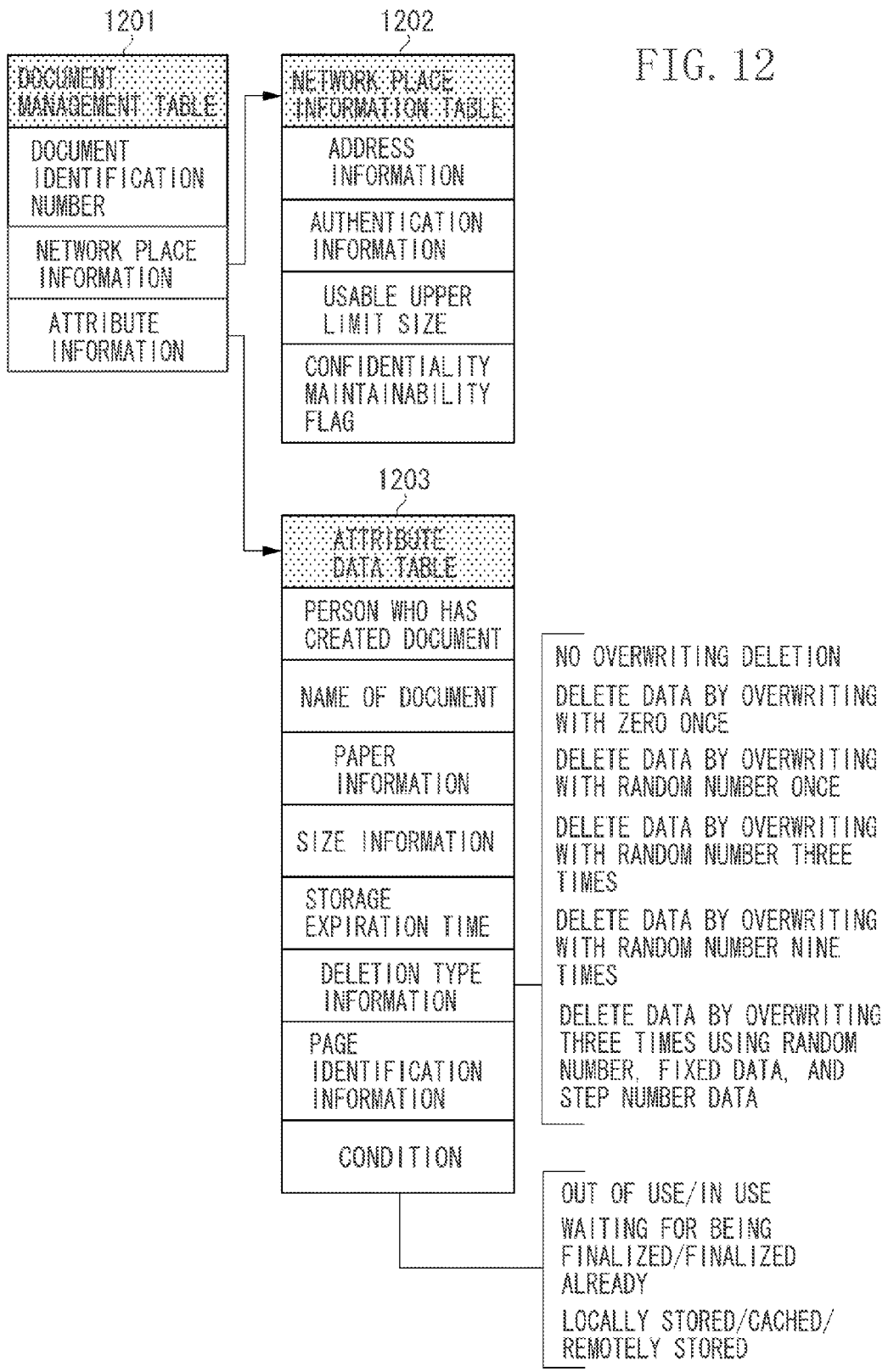
FIG. 12 illustrates an overview of a structure of document management of the image forming apparatus illustrated in FIG. 1.

FIG. 12 illustrates an overview of a structure of document management of the image forming apparatus 105 illustrated in FIG. 1.

Referring to FIG. 12, the present data structure is generated by the system program executed by the CPU 202. A table 1201 is a document management table. The table 1201 includes an identification number for uniquely identifying a document, a network place information table 1202 that indicates where the document is stored, and an attribute data table 1203 that manages attribute information of the document. The network place information table 1202 is network place information, and is a table that manages network place information where documents can be stored.

The network place information table 1202 includes address information, authentication information, an upper limit value of an available capacity, and a flag that indicates whether the place is a secure location that can maintain the confidentiality attribute indicating a confidential document, with respect to a network place. The attribute data table 1203 is a table that manages attribute data of the document.

The attribute data table 1203 includes a person who has created the document, a name of the document, paper information, file size information, a storage expiration time, a deletion type when the document will be deleted, a page identification number, and a document condition. The storage expiration time is a remaining expiration time period to be updated when the document is accessed, and periodically subtracted information indicating the number of seconds. The deletion type information indicates whether data overwriting deletion is set and what kind of overwriting deletion pattern is set. The page identification number is an identification number for uniquely identifying image data included in the document. The document condition manages a document condition required for control of a document operation, such as a state of being out of use or being in use, waiting for being fixed or having been fixed already, and having been locally stored, having been cached, or having been remotely stored. A flag indicating whether the document is out of use or in use is used to determine whether the attribute data itself is valid or invalid. Waiting for being fixed/having been fixed already is used to determine whether the document is being operated, and is in an exclusive state prohibiting the document from being edited. Having been locally stored indicates that the document is stored in its own local apparatus. Having been cached indicates that the document is stored in a network place and is also stored in its own local apparatus as a cached document. Having been remotely stored indicates that the document is stored in a network place and a cached document thereof does not remain in its own local apparatus.

Other Embodiment

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-157694 filed Jul. 30, 2013, which is hereby incorporated by reference herein in its entirety.

What is claimed is:

1. An image forming apparatus that communicates with a remote apparatus, the image forming apparatus comprising:
   a storage unit;
   a reading unit configured to read a document;
   a first determination unit configured to determine whether a confidentiality attribute has been set for the document read by the reading unit;
   a control unit configured to, in a case that the first determination unit determines that the confidentiality attribute has been set, store the document in the storage unit, and, in a case that the first determination unit determines that the confidentiality attribute has not been set, store the document in the remote apparatus; and
   a second determination unit configured to determine whether the remote apparatus includes an overwriting deletion function,
   wherein the control unit is configured to, based on a determination that the remote apparatus includes the overwriting deletion function, control movement of the document when the first determination unit determines that the confidentiality attribute has been set.

2. The image forming apparatus according to claim 1, further comprising a management unit configured to manage the document stored in the storage unit as a confidential document for which a limitation is imposed on a movement of the confidential document from the storage unit to the remote apparatus.

3. The image forming apparatus according to claim 2, wherein the management unit distinguishes between documents with associated confidentiality attributes and documents without associated confidentiality attributes in order to manage each.

4. The image forming apparatus according to claim 1, further comprising:
   a deletion unit configured to delete a cache document from the storage unit in response to a detection that a free capacity of the storage unit is less than or equal to a threshold.

5. The image forming apparatus according to claim 1, further comprising an inquiry unit configured to, in response to the second determination determining that the remote apparatus does not have the overwriting deletion function, inquire whether to move the document that the first determination unit determines that the confidentiality attribute has been set with the confidentiality attribute to the remote apparatus,
   wherein the control unit is configured to permit movement of the file with the confidentiality attribute according to a response to the inquiry unit.

6. The image forming apparatus according to claim 1, wherein the storage unit includes a first region to store the file with the confidentiality attribute and a second region to store a file obtained from the remote apparatus.

7. A method for controlling an image forming apparatus that communicates with a remote apparatus, the method comprising:

reading a document;

determining whether a confidentiality attribute has been set for the document;

storing the document in a storage unit of the image forming apparatus in response to a determination that the confidentiality attribute has been set for the document, and storing the document in the remote apparatus in response to a determination that the confidentiality attribute has not been set;

determining whether the remote apparatus includes an overwriting deletion function; and controlling, based on the determination that the remote apparatus includes the overwriting deletion function, movement of the document when it is determined that the confidentiality attribute has been set.

8. A non-transitory computer-readable storage medium storing computer executable instructions for causing a computer to execute a method, the method comprising:

reading a document;

determining whether a confidentiality attribute has been set for the document;

storing the document in a storage unit of the image forming apparatus in response to a determination that the confidentiality attribute has been set for the document, and storing the document in the remote apparatus in response to a determination that the confidentiality attribute has not been set;

determining whether the remote apparatus includes an overwriting deletion function; and controlling, based on the determination that the remote apparatus includes the overwriting deletion function, movement of the document when it is determined that the confidentiality attribute has been set.

* * * * *